United States Patent
Rajkumari et al.

(10) Patent No.: US 7,657,776 B2
(45) Date of Patent: Feb. 2, 2010

(54) CONTAINING MACHINE CHECK EVENTS IN A VIRTUAL PARTITION

(75) Inventors: Anurupa Rajkumari, Austin, TX (US); Khoa D. Nguyen, Richardson, TX (US); Marvin Spinhirne, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 510 days.

(21) Appl. No.: 11/523,892

(22) Filed: Sep. 20, 2006

(65) Prior Publication Data

US 2008/0126780 A1    May 29, 2008

(51) Int. Cl.
  *G06F 11/00* (2006.01)
(52) U.S. Cl. .......................................... 714/2
(58) Field of Classification Search ........... 714/2
  See application file for complete search history.

(56) References Cited

U.S. PATENT DOCUMENTS

| | | | |
|---|---|---|---|
| 6,247,109 B1 * | 6/2001 | Kleinsorge et al. | 712/13 |
| 6,684,346 B2 | 1/2004 | Tu et al. | |
| 6,851,074 B2 | 2/2005 | Mioiicic et al. | |
| 7,325,163 B2 * | 1/2008 | Kondajeri et al. | 714/25 |
| 2002/0116438 A1 | 8/2002 | Tu et al. | |
| 2002/0162050 A1 | 10/2002 | Mioiicic et al. | |
| 2004/0019835 A1 * | 1/2004 | Marisetty et al. | 714/48 |
| 2006/0010450 A1 * | 1/2006 | Culter | 718/104 |

* cited by examiner

*Primary Examiner*—Scott T Baderman
*Assistant Examiner*—Jigar Patel

(57) ABSTRACT

Embodiments include methods, apparatus, and systems for containing machine check events in a virtual partition. One embodiment is a method of software execution. The method divides a hard partition into first and second virtual partitions and attempts to correct an error in a firmware layer of the first virtual partition. If the error is not correctable, then the method reboots the first virtual partition without disrupting hardware resources in the second virtual partition.

20 Claims, 4 Drawing Sheets

CONTAINING MACHINE CHECK EVENTS IN A VIRTUAL PARTITION

BACKGROUND

Error detection, correction, and recovery are important features in computers and computer systems. Machine check events, including machine check abort (MCA) events, occur in a processor when an error condition occurs that requires corrective action. These errors occur for a variety of hardware and software reasons, such as system bus errors, memory errors, and cache errors, to name a few examples.

Machine check events include both local and global events. Local errors occur in a processor that encounters an internal error or platform error. These errors are not broadcast to other processors. By contrast, global errors result in a system wide broadcast that notifies other processors of an error condition. In response to the broadcast, all the processors in the domain enter an error handling mode and process the error event.

Machine check events can be quite harmful and affect the entire hard partition. If the event is not cured, then it can cause the system to perform a crash dump and reboot. In other words, these errors are not limited to a portion of the hard disk partition, but adversely affect the entire hard partition and operating system. In addition, the system has to incur downtime for system failure analysis and correction and often requires servicing.

As computers and computer systems become faster and more complex, addressing hardware and software errors, such as machine check events, becomes increasingly important. In order to help ensure the integrity of such computers systems, the adverse effects of these errors should be minimized or eliminated.

DETAILED DESCRIPTION

Embodiments in accordance with the present invention are directed to apparatus, systems, and methods for containing errors or machine checks within a virtual partition of a hard partition. In one exemplary embodiment, certain machine check events are contained to a local virtual partition instance and do not affect the entire hard partition. When a system runs in virtual partition mode, the system firmware performs error processing and examines the system state to ensure errors are contained within one virtual partition. The system firmware also performs system clean-up of local error events, such as machine check abort (MCA) events. These clean-up operations are performed without adversely affecting or disrupting any hardware resources that belong to other virtual partitions before transferring control to the operating system (OS), such as an OS MCA handler.

Exemplary embodiments reduce the scope of the machine check to one virtual partition instance and thus allow higher availability of the hard partition. System firmware isolates certain categories of MCA error events to a single virtual partition. Since the machine check does not affect the rest of the virtual partitions running on the hard partition, the system is not required to shut down or reboot to perform, for example, error analysis. Users can schedule a reboot time or down-time for replacing faulty hardware or software. Further, the entire hard partition is not shut down to perform system error analysis.

In one exemplary embodiment, when a MCA occurs, the system firmware ensures that the MCA is contained within a virtual partition (vPar). First, the firmware distinguishes between local MCA error events and global MCA error events. Global events occur when all the processors in the hard partition are affected. Next, the firmware checks to ensure that system locks and semaphores internal to the firmware are intact. The locks and semaphores determined to be critical are not held by the central processing unit (CPU). With exemplary embodiments, cleaning of the affected hardware does not affect any shared resources across multiple virtual partitions. As such, the virtual partition monitor that runs between the firmware and the operating system performs a directed reset or reboot of just the affected virtual partition.

Figure 1:
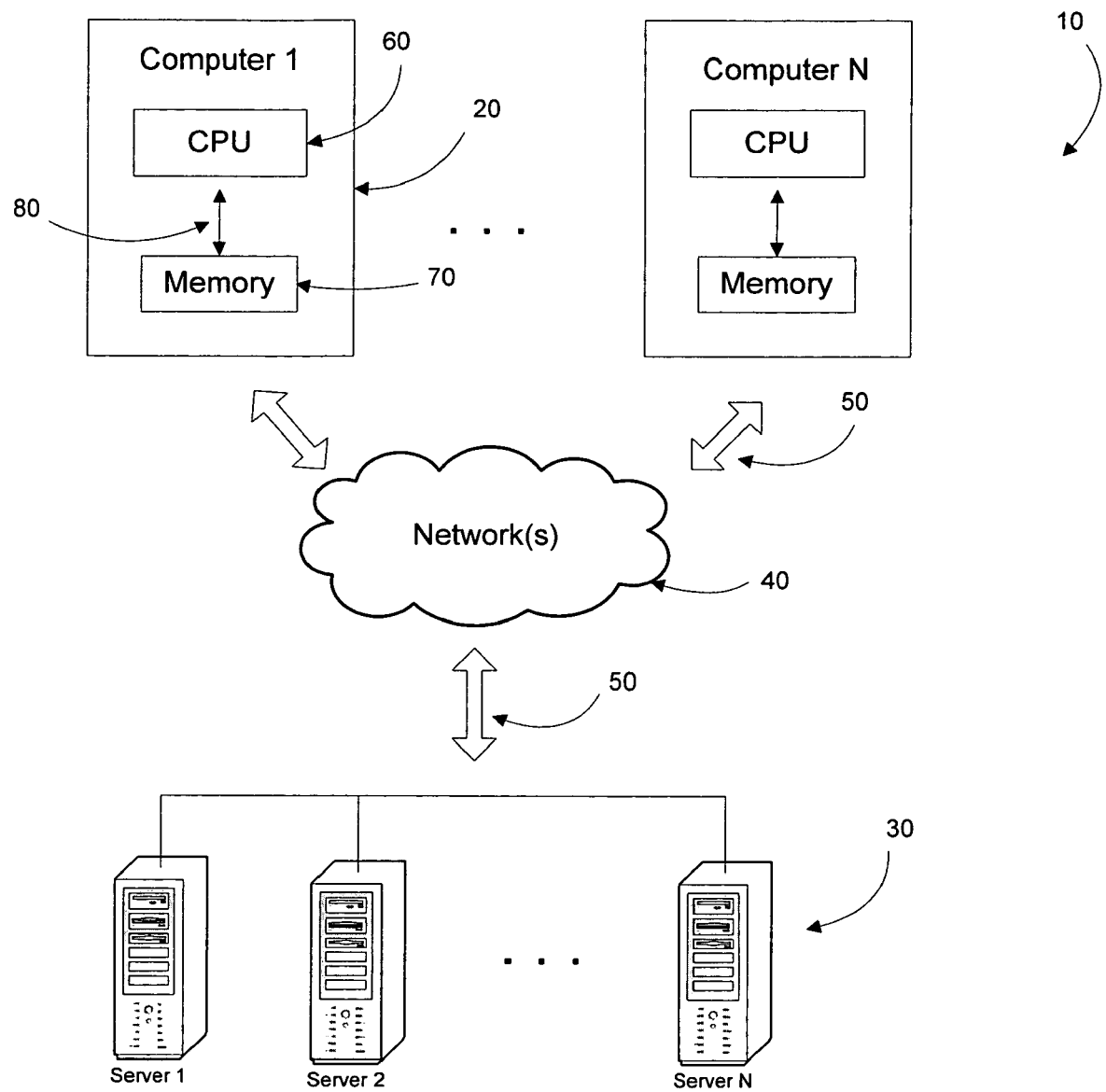
FIG. 1 is an exemplary computer system in accordance with an exemplary embodiment of the present invention.

FIG. 1 illustrates an exemplary system 10 utilizing embodiments in accordance with the invention. The system 10 includes one or more computers 20 (such as host computers or workstations, shown as computer 1 through computer N) connected to one or more servers 30 (shown as server 1 through server N) through one or more networks 40. The computers 20 and servers 30 communicate with the network along communication paths 50.

The computers 20 comprise a processing unit 60 (such as one or more processors or central processing units, CPUs) for controlling the overall operation of memory 70 (such as random access memory (RAM) for temporary data storage and read only memory (ROM) for permanent data storage). The memory 70 stores data, control programs, and other data associate with computers 20. The processing unit 60 communicates with memory 60 and many other components via buses 80.

Embodiments in accordance with the present invention are not limited to any particular type or number of computers, servers, or computer systems. These devices, for example, include various portable and non-portable computers and/or electronic devices, such as servers, main frame computers, distributed computing devices, laptops, and other electronic devices and systems whether such devices and systems are portable or non-portable.

Figure 2:
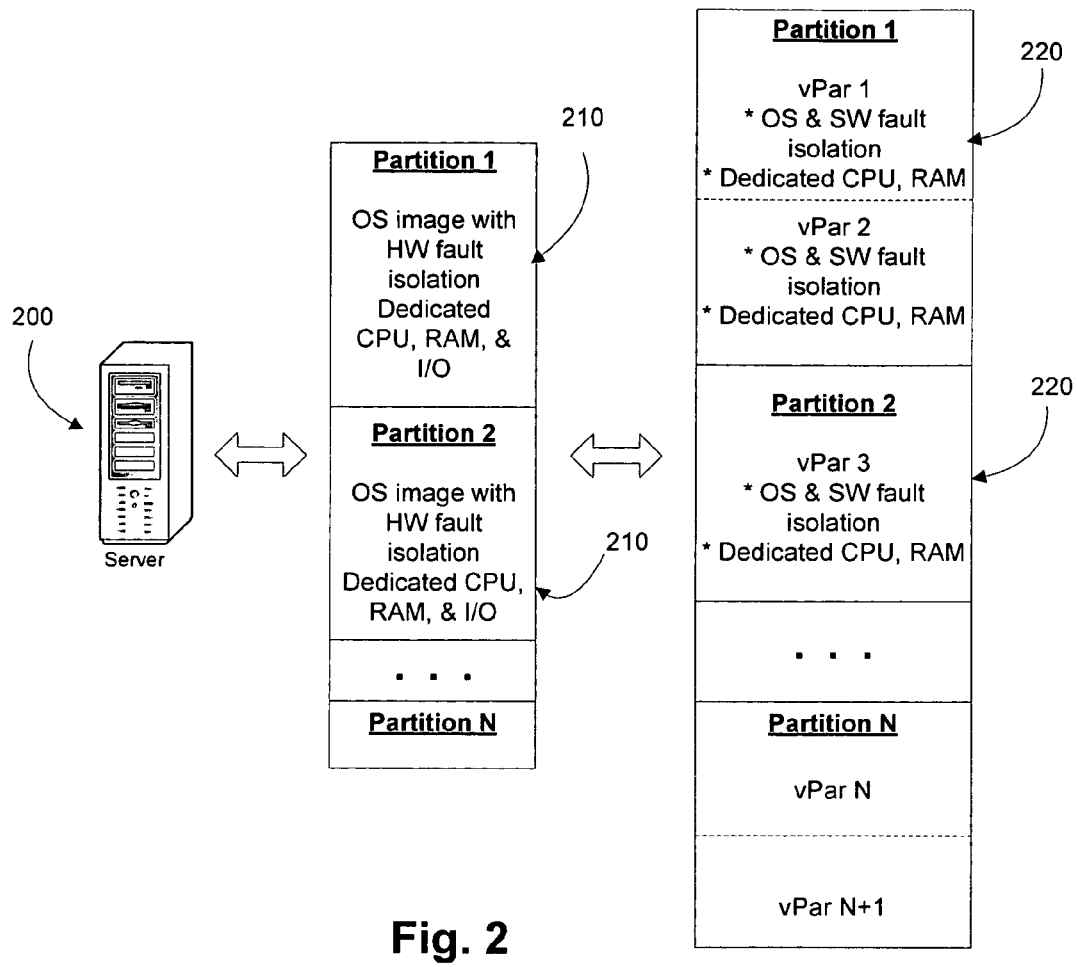
FIG. 2 is a block diagram of a computer showing multiple virtual partitions in a hard partition in accordance with an exemplary embodiment of the present invention.

FIG. 2 is a block diagram of a computer 200 (example, a server) showing multiple virtual partitions in accordance with an exemplary embodiment of the present invention. One exemplary embodiment enables failover and disaster-tolerant environments that utilize multiple operating systems without the need for redundant hardware. As such, multiple applications can be safely allocated within a single system or partition. Hard partitions are divided into one or more virtual partitions. The virtual partitions combine software and hardware fault isolation with the ability to share resources with other virtual partitions within a same system. A user is able to configure a single server as multiple smaller systems having multiple OS partitions that provide electrical and software isolation.

As used herein, a "partition" means a physical or logical mechanism for isolating operation environments within one or more computers, memory, or mass storage. Several files systems can be included on a single hard disk. By way of example in disk operation systems (DOS), disks are partitioned so each partition behaves likes a separate disk drive. Partitioning enables different or identical operating systems to be run on each partition. Partitioning also includes hard partitions (example, physically dividing a disk into different sections) and soft partitions.

Partitioning protects applications in each partition from disruptive events occurring in other partitions and thus prevents service disruption and performance degradation. Applications are isolated in a partition and have dedicated use of server resources and can be separately managed and configured.

As shown in FIG. 2, the server 200 is partitioned into a plurality of hard partitions 210 (shown as partition 1 through partition N). By way of example, each hard partition is shown to have an OS image with hardware (HW) fault isolation and dedicated CPU, RAM, and input/output (I/O). In one exemplary embodiment, the hard partitions occur within a single physical node, such as server 200 being part of a cluster of servers (example, see FIG. 1).

Hard partitions are partitions with hardware isolation within a single system (multiple operating system images with hardware isolation). Applications and operating environments execute in system partitions that are electrically isolated and protected from one another by hardware separation. Hardware failures are confined to the partition in which the hardware failure occurs. Reconfiguration or rebooting of an individual hard partition does not require a reboot of the entire system since each hard partition has its own CPU, memory, and I/O resources.

Each hard partition 210 can be further divided into one or more virtual partitions (vPar) 220. For instance, hard partition 1 is divided into two virtual partitions (vPar 1 and vPar 2). Each virtual partition has an operating system and software (SW) fault isolation and dedicated CPU and RAM.

Virtual partitions are logical partitions within the hard partition and have software fault isolation either within the hard partition or a single server (example, multiple operating system images with software isolation). Virtual partitions are created with software, execute their own operating system image, and host their own applications. Each virtual partition can have its own specified memory amount or ranges of physical memory, a specified pool of CPUs, and a set of I/O cards within the server. Thus, virtual partitions offer complete software isolation to a single-system hard partition or single server node. Thus, a fault or machine check occurring in one virtual partition will not impact either the operating system or applications executing within another virtual partition, even if the other virtual partition is on the same hard partition and on the same server. Since each virtual partition executes its own operating system, a single server can run multiple operating system instances in different virtual partitions that are each isolated from each other.

Figure 3:
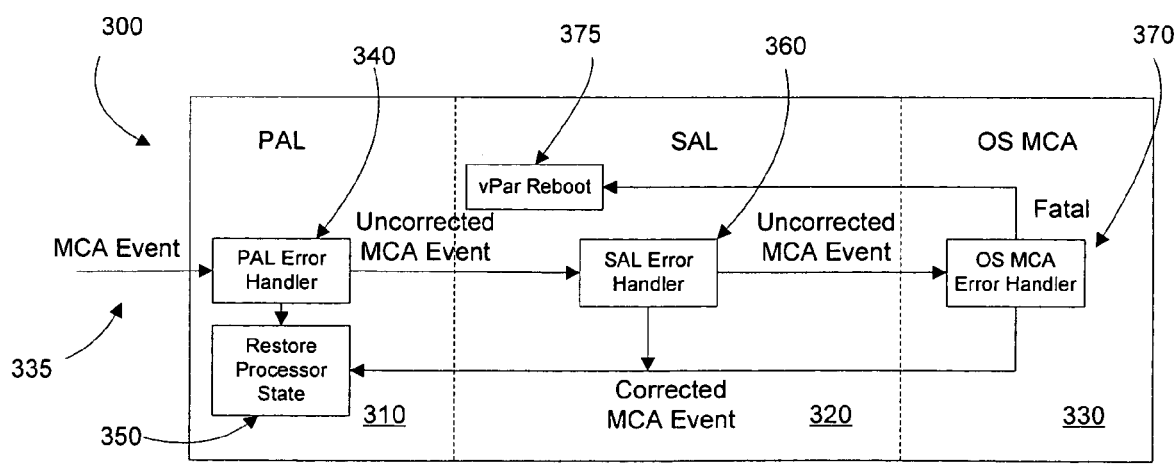
FIG. 3 is a block diagram of firmware layers for a processor in accordance with an exemplary embodiment of the present invention.

FIG. 3 is a block diagram of firmware layers 300 for a processor in accordance with an exemplary embodiment of the present invention. By way of example, the processor includes a processor abstraction layer (PAL) 310 and a system abstraction layer (SAL) 320 that communicate with an operating system machine check abort (OS MCA) layer 330. FIG. 3 shows an exemplary embodiment of how the PAL, SAL, and OS work together to identify and resolve errors, such as machine check aborts, platform errors, processor errors, etc.

Errors can originate locally or globally. A local MCA is confined within the processor that discovered the internal or platform error. Local errors are not broadcast to other processors or partitions in the system. By contrast, global errors initiate a system wide broadcast of the error (i.e., notification to other partitions and processors). For instance, in a global MCA, all processors enter their respective error handlers to process the received error.

Errors can be further classified into one of three types: correctable, recoverable, and fatal or non-recoverable. Correctable errors are corrected in hardware or firmware with execution continuing. Hardware corrected errors are corrected by the processor or platform hardware without involving the firmware. Firmware corrected errors (i.e., errors not corrected by the processor or hardware) are corrected in the PAL or SAL. Once the firmware corrects the error, execution of the interrupted context is resumed. Recoverable errors are corrected in the OS. Here, if the hardware and firmware cannot correct the error, control passes to the OS. If the error is recoverable, the virtual partition is not rebooted. If, on the other hand, the OS cannot correct the error, then a fatal error occurs. With fatal errors, the virtual partition is reset or rebooted.

In one exemplary embodiment, system errors occur in any one of the PAL, the SAL, the OS, the processor hardware, and the platform hardware. When the processor or hardware identifies an error that is not hardware correctable, an MCA event is triggered. This event is initially passed to the firmware, namely the PAL and SAL for correction. If the event is corrected in the firmware, then control is returned to the interrupted context without OS intervention. On the other hand, if the firmware is not able to correct the event, then control is passed to the OS. The OS corrects the event, if possible, and then returns control to the interrupted context, switches to a new context, or reboots the virtual partition.

As shown in FIG. 3, a MCA event 335 is triggered and passed to a PAL error handler 340 (such as a PAL MCA handler) in the PAL 310. If the PAL is able to correct the error, then control returns to the interrupted context by restoring the state of the processor 350. If the PAL is not able to correct the error, then control passes to a SAL error handler 360 (such as a SAL MCA handler) in the SAL 320.

If the SAL is able to correct the error, then control returns to the interrupted context by restoring the state of the processor 350. In addition to attempting to correct the error, the SAL performs various functions, such as processing the MCA exchange with the PAL, retrieving error record information, logging error information, etc. The SAL obtains information about the error and communicates this information to the OS MCA error handler 370 if the SAL is not able to correct the error.

If the OS is able to correct the error, then control returns to the interrupted context by restoring the state of the processor 350. If the OS is not able to correct the error, then the process returns to the SAL and a reboot of the virtual partition is requested 375. The SAL logs the event and performs a reboot of the virtual partition.

Figure 4A:
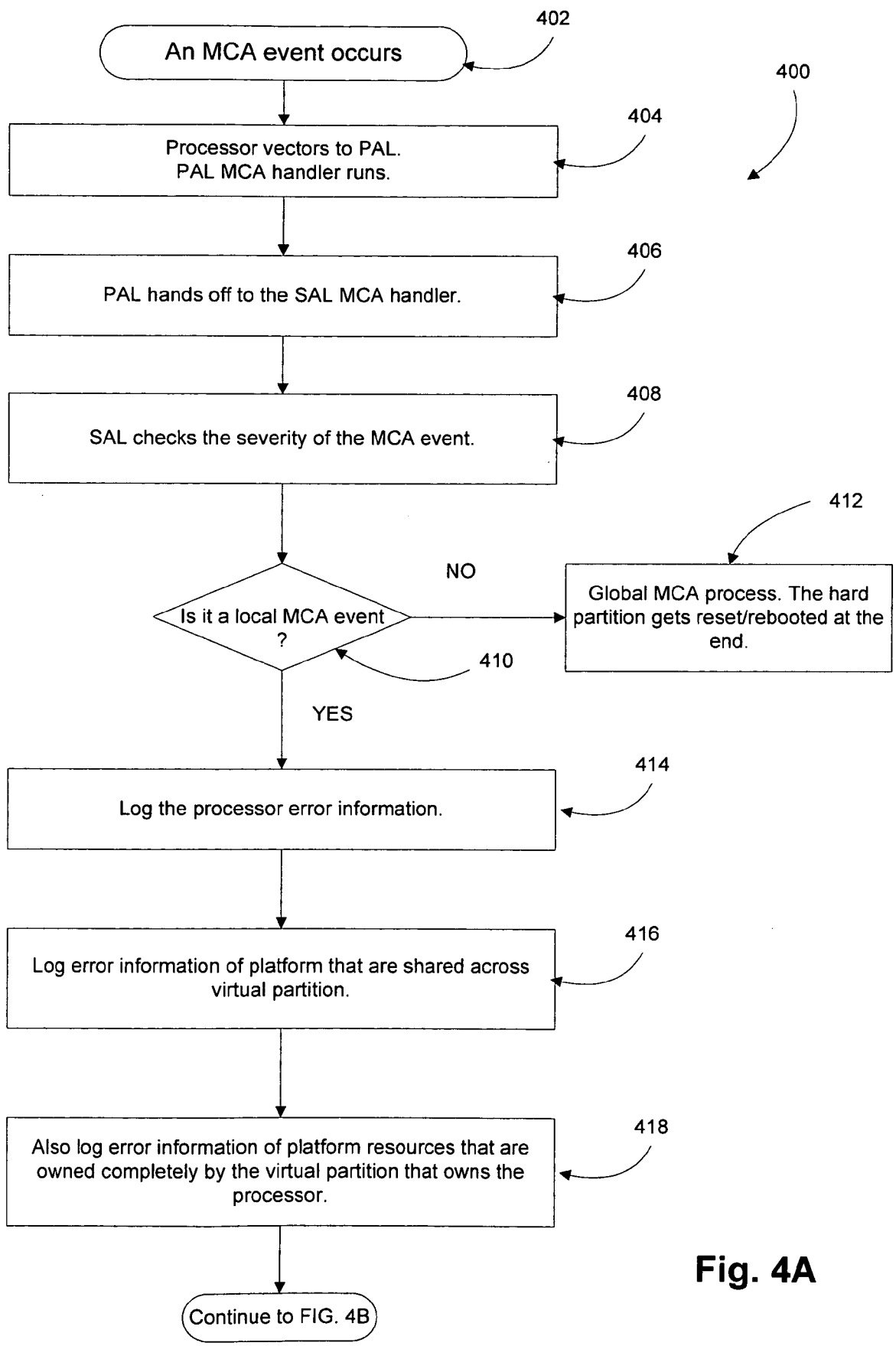
FIG. 4A is an exemplary flow diagram for containing an error in a virtual partition in accordance with an exemplary embodiment of the present invention.
Figure 4B:
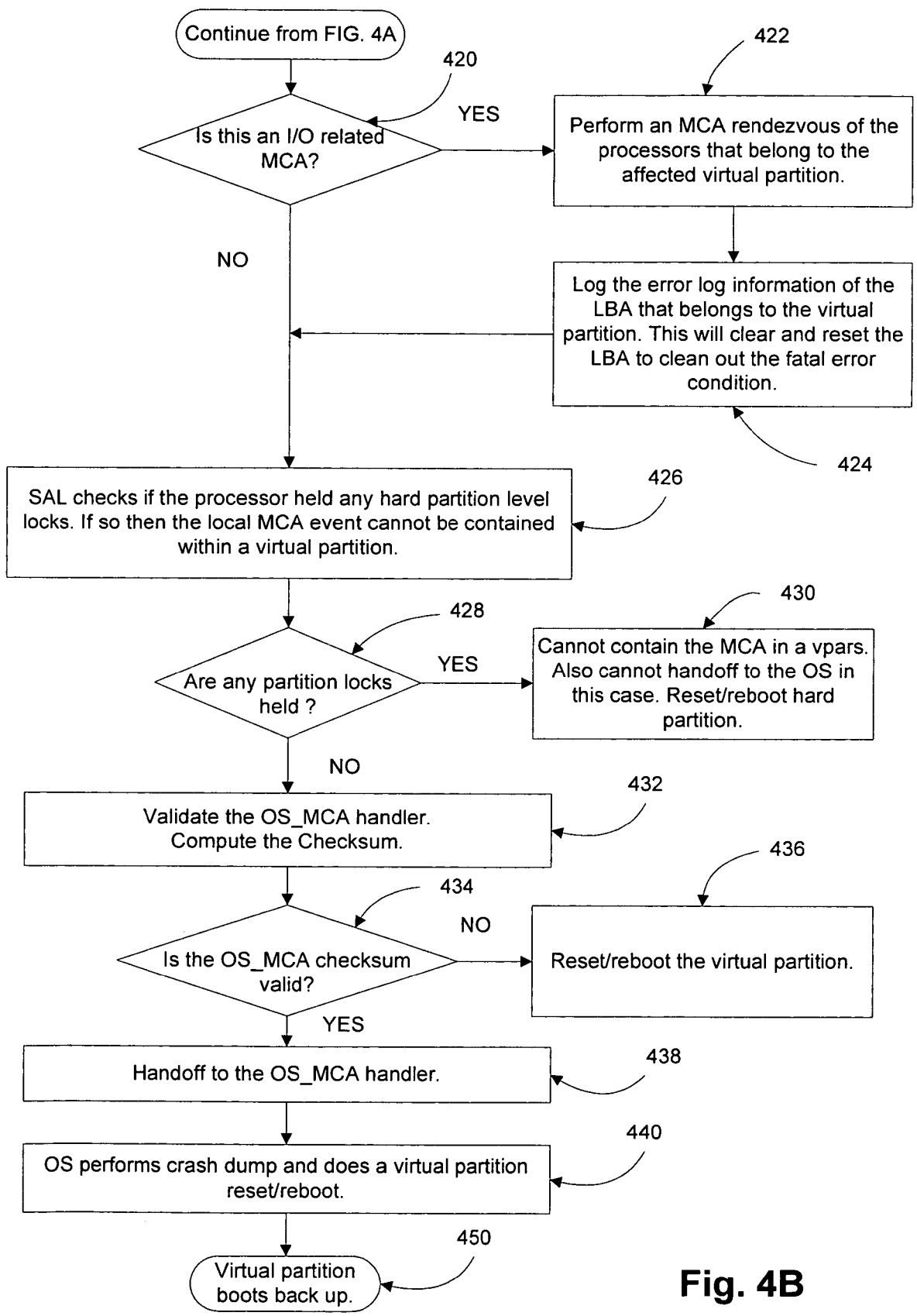
FIG. 4B is a continuation of FIG. 4A showing an exemplary flow diagram for containing an error in a virtual partition in accordance with an exemplary embodiment of the present invention.

FIGS. 4A and 4B are an exemplary flow diagram 400 for containing an error in a virtual partition in accordance with an exemplary embodiment of the present invention. According to block 402, an MCA event occurs. By way of example, this event includes correctable errors, recoverable errors, fatal errors, global events, and local events.

According to block 404, the processor vectors to the PAL, which receives the event and initiates a PAL MCA handler. If the PAL MCA handler is able to correct the MCA event then control is returned to the interrupted context without the SAL and OS intervention.

According to block 406, if the PAL MCA handler is not able to correct the event, then the PAL hands off to the SAL, which receives the event and initiates a SAL MCA handler. The SAL performs various functions, such as records processor and platform error information, saves state information, validates the OS MCA entry point, etc.

According to block 408, a SAL MCA handler checks the severity of the event. At block 410, a question is asked: is it a local MCA event? If the answer to this question is "no" then flow proceeds to block 412 which indicates a global MCA process. For a global event, the hard partition gets reset or rebooted (example, the system restarts the OS) at the end. If the answer to this question is "yes" then the event is local and flow proceeds to block 414 wherein the processor error information is logged.

According to block 416, the SAL logs error information of the platforms that are shared across the virtual partition. Further, according to block 418, the SAL logs error information of platform resources that are completely owned by the virtual partition that owns the processor.

According to block 420, the SAL makes an inquiry: Is the event an I/O related MCA? If the answer to this question is "yes" then flow proceeds to block 422. Here, the SAL performs a rendezvous of the processors that belong to the affected virtual partition. In a rendezvous, the processors are brought to a known architectural state. Next, according to block 424, the SAL logs the error log information of the Local Bus Adaptor (LBA) that belongs to the virtual partition. This process clears and resets the LBA to clean out the fatal error condition. Flow then proceeds to block 426.

If the answer to the question is "no" then flow proceeds to block 426. Here, the SAL checks if the processor held any hard partition level locks. If the processor holds such locks, then the local MCA even cannot be contained within the virtual partition.

According to block 428, a question is asked: Are any partition locks held? If the answer to this question is "yes" then flow proceeds to block 430. Here, the MCA event cannot be contained in the virtual partition. Further, the MCA event cannot be transferred to the OS. The hard partition is reset or rebooted.

If the answer to the question is "no" then flow proceeds to block 432. The OS_MCA handler is validated by computing a modulo checksum of the operating system MCA handler code, addition of all bytes including the checksum byte registered by the OS during boot should add up to 0.

According to block 434, a question is asked: Is the OS_MCA checksum valid? If the answer to this question is "no" then flow proceeds to block 436. Here, the virtual partition is reset or rebooted. If the answer to this question is "yes" then flow proceeds to block 438. Here, the SAL transfers the event to the OS_MCA handler. The OS_MCA retrieves the error records, state information, and performs other tasks.

According to block 440, the OS performs a crash dump and resets or reboots the virtual partition. According to block 450, the virtual partition reboots.

Once the event is passed to the OS_MCA, the OS uses the state information and decides whether to recover the interrupted context. If the error is recoverable, then the error is corrected and notification is sent to the SAL which invokes the PAL to return to the interrupted or new context. If the MCA event is not corrected, then return to the SAL with instruction to the SAL to halt or reboot the virtual partition.

In one exemplary embodiment, MCA events are typically hardware errors that are within two categories. A first category includes CPU errors that occur within components of the CPU itself, such as tlb, cache, errors on the front side bus, etc. A second category includes platform errors that are transferred to the CPU. One skilled in the art appreciates that system designers can define when an error is processed as an MCA event or other type of error. Further, hardware error events can be sent to specific pins on the CPU to be processed as MCA events. MCA events and other errors or faults are further definable according to a variety of nomenclature. For instance, fatal errors can be defined as errors that lead to non-recoverable data loss or non-recoverable corruption. In this instance, the virtual partition is restarted. In other instances, non-fatal errors or correctable errors can be defined as errors corrected with hardware, firmware, or some form of software. By way of example, non-fatal errors include a correctable machine check error or a correctable platform error. Further, in order to ensure that the OS can parse and analyze the error, a generic format is used for the error records.

Exemplary embodiments are shown using two different firmware layers, namely the PAL and SAL. Further, exemplary embodiments provide specific examples regarding communication protocol between the PAL, the SAL, the OS MCA, and various other hardware, software, and firmware. These embodiments are exemplary and would change depending on, for example, the design of the processor, processing system, hardware, software, firmware, server, etc. Embodiments in accordance with the present invention are utilized in a variety of systems, methods, and apparatus and not limited to the exemplary embodiments provided herein. Further, one or more computers, processors, or computer systems execute the flow diagram and/or aspects of exemplary embodiments in accordance with the present invention.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of software execution executed by computer, comprising:
   dividing a hard partition into first and second virtual partitions;
   attempting to correct an error in a firmware layer of the first virtual partition;
   determining, in the firmware layer of the first virtual partition, whether a processor in the first virtual partition holds a hard partition level lock;
   rebooting both the first and second virtual partitions when the processor holds the hard partition level lock; and
   rebooting the first virtual partition without disrupting hardware resources in the second virtual partition when the error is not correctable and the processor does not hold the hard partition level lock.

2. The method of claim 1 further comprising, if the error is correctable in the firmware layer, then returning to an interrupted context without disrupting processing in the second partition.

3. The method of claim 1 further comprising, performing clean-up operations of local error events in the first virtual partition without disrupting hardware resources in the second virtual partition.

4. The method of claim 1 further comprising, rebooting the first virtual partition without disrupting applications running in the second virtual partition.

5. The method of claim 1 further comprising, if the error is not correctable in the firmware layer, then transferring control to an operating system machine check abort (OS MCA) layer in the first virtual partition without disrupting operations of an operating system in the second virtual partition.

6. The method of claim 1 further comprising, if the error is an input/output (I/O) event, then performing a rendezvous of processors belonging to the first virtual partition.

7. The method of claim 1 further comprising, passing the error from a processor abstraction layer (PAL) to a system abstraction layer (SAL) if the error is not correctable in the PAL.

8. A computer readable storage medium having instructions for causing a computer to execute a method, comprising:
   dividing a hard partition into plural virtual partitions;
   receiving a machine check abort (MCA) event in a firmware layer of one of the plural virtual partitions;
   determining, in the firmware layer of the one of the plural virtual partitions, whether a processor in the one of the plural virtual partitions holds a partition lock;
   rebooting the plural virtual partitions in the hardware partition when the processor holds the partition lock; and
   rebooting the one of the plural virtual partitions without affecting hardware resources in other virtual partitions of the plural virtual partitions when the error is not correctable and the processor does not hold the partition lock.

9. The computer readable storage medium of claims 8 further comprising, shutting down the one of the virtual partitions to perform system error analysis without shutting down the other of the plural virtual partitions.

10. The computer readable storage medium of claim 8 further comprising, isolating the MCA event to the one of the virtual partitions without disrupting processing events of the other of the plural virtual partitions running on the hard partition.

11. The computer readable storage medium of claim 8 further comprising, rebooting the one of the virtual partitions without affecting shared resources across the other of the plural virtual partitions.

12. The computer readable storage medium of claim 8 further comprising, if the MCA event us corrected in the firmware layer of the one of the virtual partitions, then returning to an interrupted context without disrupting the hardware resources in the other of the plural virtual partitions.

13. The computer readable storage medium of claim 8 further comprising, passing the MCA event between different firmware layers in the one of the virtual partitions without disrupting applications running in the other of the plural virtual partitions.

14. The computer readable storage medium of claim 8 further comprising, logging error information of platforms that are shared across the plural virtual partitions.

15. A computer system, comprising:
   a hard partition that is divided into plural virtual partitions; and
   plural firmware layers in one of the virtual partitions, the firmware layers containing a machine check event in the one of the virtual partitions, wherein a determination is made, in a firmware layer of the one of the virtual partitions, whether a processor in the one of the virtual partitions holds a partition lock; the virtual partitions in the hardware partition are rebooted when the processor holds the partition lock; and the one of the virtual partitions is rebooted without affecting hardware resources in other virtual partitions of the virtual partitions when the error is not correctable and the processor does not hold the partition lock.

16. The computer system of claim 15 further comprising, a processor abstraction layer (PAL) and a system abstraction layer (SAL) in the firmware layers, wherein the PAL passes the machine check event to the SAL without disrupting operations of applications in the other of the virtual partitions.

17. The computer system of claim 15 further comprising, a system abstraction layer (SAL) in th firmware layers that checks if a processor in the one of the virtual partitions hold a hard partition level lock.

18. The computer system of claim 15 further comprising, an operating system machine check abort (OS MCA) handler that reboots the one of the virtual partitions without rebooting the other of the virtual partitions.

19. The computer system of claim 15, wherein the plural firmware layers correct the machine check event without disrupting operations in the other of the virtual partitions.

20. The computer system of claim 15, wherein the plural firmware layers correct the machine check event and perform clean-up of local error events without affecting hardware resources belonging to the other of the virtual partitions.

* * * * *

UNITED STATES PATENT AND TRADEMARK OFFICE
CERTIFICATE OF CORRECTION

PATENT NO. : 7,657,776 B2  Page 1 of 1
APPLICATION NO. : 11/523892
DATED : February 2, 2010
INVENTOR(S) : Anurupa Rajkumari et al.

It is certified that error appears in the above-identified patent and that said Letters Patent is hereby corrected as shown below:

In column 8, line 4, in Claim 9, delete "claims" and insert -- claim --, therefor.

In column 8, line 17, in Claim 12, delete "us" and insert -- is --, therefor.

In column 8, line 50, in Claim 17, delete "th" and insert -- the --, therefor.

Signed and Sealed this

Eleventh Day of May, 2010

David J. Kappos
*Director of the United States Patent and Trademark Office*